US010089457B2

(12) United States Patent
Liu et al.

(10) Patent No.: US 10,089,457 B2
(45) Date of Patent: Oct. 2, 2018

(54) UNLOCKING DEVICE TO ACCESS UNCERTIFIED NETWORKS

(71) Applicant: COMPAL ELECTRONICS, INC., Taipei (TW)

(72) Inventors: Chih-Chien Liu, Taipei (TW); Yi-Chang Chen, Taipei (TW); Chih-Hsing Kang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 171 days.

(21) Appl. No.: 15/097,298

(22) Filed: Apr. 13, 2016

(65) Prior Publication Data
US 2016/0226873 A1  Aug. 4, 2016

Related U.S. Application Data

(63) Continuation-in-part of application No. 13/851,111, filed on Mar. 27, 2013.

(30) Foreign Application Priority Data

Dec. 25, 2012  (TW) .............................. 101149831 A

(51) Int. Cl.
*G06F 21/50* (2013.01)
*H04L 29/06* (2006.01)
(Continued)

(52) U.S. Cl.
CPC ............ *G06F 21/50* (2013.01); *G06F 21/572* (2013.01); *G06F 21/575* (2013.01); *G06F 21/74* (2013.01);
(Continued)

(58) Field of Classification Search
CPC ...... G06F 21/50; G06F 21/572; G06F 21/575; G06F 21/81; G06F 21/74; G06F 21/88;
(Continued)

(56) References Cited

U.S. PATENT DOCUMENTS 7,702,329 B1 *  4/2010  Durig .................... H04W 8/183
                                                         455/432.1
2005/0037732 A1 *  2/2005  Kotzin ................. H04M 15/00
                                                         455/411
(Continued)

FOREIGN PATENT DOCUMENTS

TW    200945846 A    11/2009
TW    201010464 A1    3/2010

*Primary Examiner* — Theodore C Parsons
(74) *Attorney, Agent, or Firm* — CKC & Partners Co., Ltd.

(57) ABSTRACT

An application program is implemented by an electrical device for executing a wireless network certification process, which includes the following steps: driving a network module of the electrical device to receive a certification code broadcasted by a wireless network access point (AP), determining whether or not the certification code is in an identified list, wherein when the certification code is not in the identified list, the application program executes a first action to limit the electrical device to a limited function mode; and when an unlock password is received, the application program executing a second action to unlock the electrical device to an un-limited function mode; and when the electrical device is in the un-limited function mode and a connecting password is received, driving the network module of the electrical device to connect to the network AP.

19 Claims, 3 Drawing Sheets

(51) Int. Cl.
- *G06F 21/74* (2013.01)
- *G06F 21/88* (2013.01)
- *G06F 21/81* (2013.01)
- *H04W 12/08* (2009.01)
- *H04W 88/00* (2009.01)
- *H04W 48/00* (2009.01)
- *H04W 48/20* (2009.01)
- *H04W 48/18* (2009.01)
- *H04W 48/10* (2009.01)
- *H04W 48/16* (2009.01)
- *H04W 48/08* (2009.01)
- *G06F 21/57* (2013.01)
- *H04W 84/12* (2009.01)

(52) U.S. Cl.
CPC .............. *G06F 21/81* (2013.01); *G06F 21/88* (2013.01); *H04L 63/0876* (2013.01); *H04L 63/10* (2013.01); *H04W 12/08* (2013.01); *H04W 48/00* (2013.01); *H04W 48/08* (2013.01); *H04W 48/10* (2013.01); *H04W 48/16* (2013.01); *H04W 48/17* (2013.01); *H04W 48/18* (2013.01); *H04W 48/20* (2013.01); *H04W 88/005* (2013.01); *H04L 63/101* (2013.01); *H04W 84/12* (2013.01)

(58) Field of Classification Search
CPC ..... H04W 48/10; H04W 48/08; H04W 48/16; H04W 48/00; H04W 88/005; H04W 48/18; H04W 48/20; H04W 48/17; H04W 12/08; H04W 84/12; H04L 63/10; H04L 63/0876; H04L 63/101
See application file for complete search history.

(56) References Cited

U.S. PATENT DOCUMENTS

| | | |
|---|---|---|
| 2007/0186276 A1 | 8/2007 | McRae et al. |
| 2008/0066157 A1 | 3/2008 | Stevens et al. |
| 2009/0254995 A1* | 10/2009 | John ................. G06F 21/74 726/27 |
| 2009/0300753 A1* | 12/2009 | Lin ................... G06F 21/34 726/16 |
| 2012/0066738 A1* | 3/2012 | Cohan ............ H04L 63/0263 726/1 |
| 2012/0135711 A1 | 5/2012 | Jabara et al. |
| 2013/0039352 A1 | 2/2013 | Ruster et al. |
| 2013/0040603 A1 | 2/2013 | Stahlberg et al. |
| 2014/0079022 A1 | 3/2014 | Wang et al. |

\* cited by examiner

UNLOCKING DEVICE TO ACCESS UNCERTIFIED NETWORKS

RELATED APPLICATIONS

This application is a continuation-in-part of U.S. application Ser. No. 13/851,111 filed on Mar. 27, 2013, which claims priority of Taiwan Application Serial Number 101149831, filed Dec. 25, 2012, which are incorporated herein by reference in their entireties.

BACKGROUND

Technical Field

The present disclosure relates to a computer readable storage for storing an application program for network certification.

Description of Related Art

With the rapid development of computer-communication-consumer (3C) industry, electrical devices are more frequently used as assisting tools of our daily life. For examples, the popular electrical devices may include personal digital assistants (PDAs), mobile phones, smart phones, notebook (NB) and computers, etc. To attract the increasing amount of the consumers of the electrical devices, a wide variety of functions are developed. However, along with the popularity of the electrical devices and their more and more compact design, the stolen electrical devices are also increasingly reported.

As a result, there is a need to prevent an electrical device from being stolen in the art.

SUMMARY

According to one embodiment of the present disclosure, a non-transitory computer readable storage medium for storing an application program for network certification is disclosed. The application program is implemented by an electrical device to execute a network certification process. The network certification process includes the following steps: a network module of the electrical device is driven to receive a certification code, which is broadcasted by a network access point (AP). Determine if the certification code is in an identified list. When the certification code is not in the identified list, the application program executes an action to limit communication between the electrical device and the network AP.

According to one embodiment of the present disclosure, a non-transitory computer readable storage medium for storing an application program for network certification is disclosed. The application program is implemented by an electrical device to execute a network certification process. The network certification process includes steps as follows. A network module of the electrical device is driven to receive a certification code, which is broadcasted by a network access point (AP). A determination is made regarding whether the certification code is in an identified list. When the certification code is not in the identified list, the application program executes a first action to limit the electrical device to a limited function mode. When an unlock password is received, the application program executing a second action to unlock the electrical device to an un-limited function mode. When the electrical device is in the un-limited function mode and a connecting password is received, driving the network module of the electrical device to connect to the network AP.

The present disclosure can achieve many advantages. When the electrical device applying the present disclosure is taken away from the area served by the network AP in the identified list, the electrical device cannot perform all supported functions. In addition, the network AP is usually disposed in a fixed position, which can not be moved easily, and the certification code of the network AP can not be stolen or reproduced easily after being encrypted by a security key. Accordingly, the network certification process of the present disclosure can be used in the Ethernet network or wireless network, and may not be broken easily by stealing or reproducing the certification code. Furthermore, others may not want to seal the electrical device applying the present disclosure.

These and other features, aspects, and advantages of the present disclosure will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
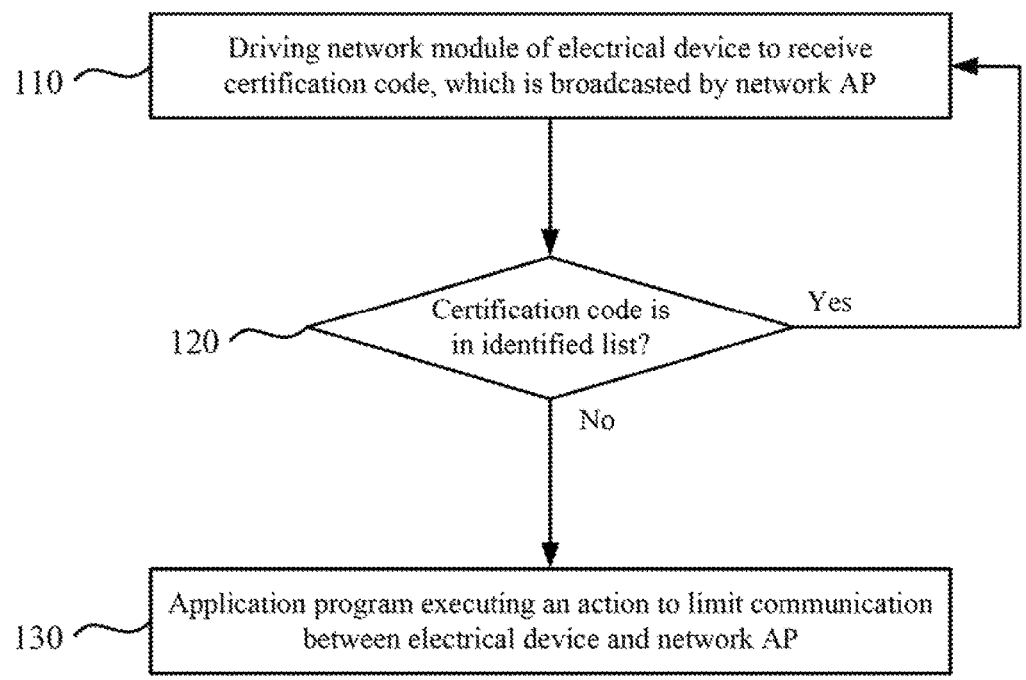
FIG. 1 is a flow diagram of a network certification process according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
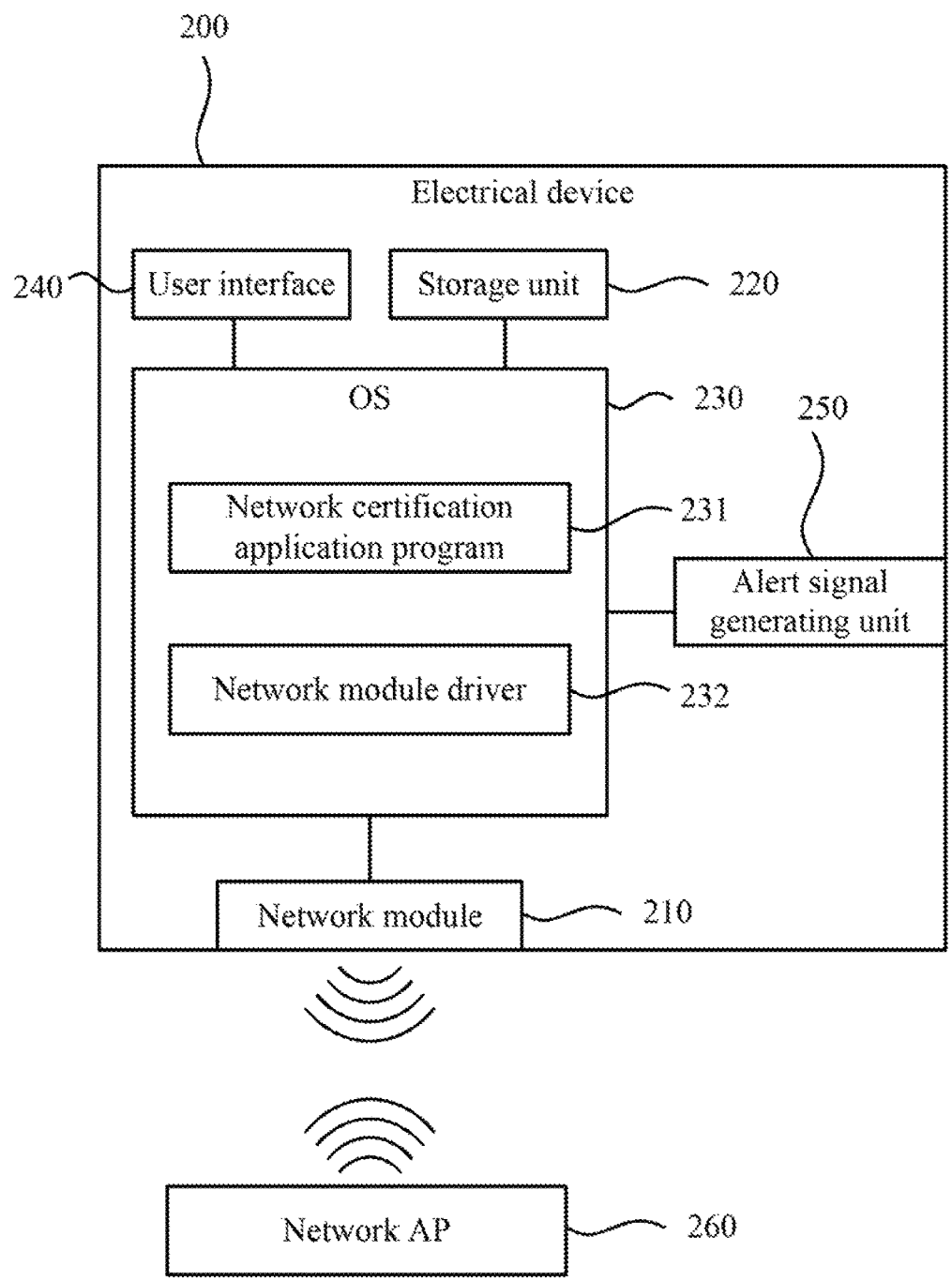
FIG. 2 illustrates a block diagram of an electrical device according to one embodiment of the present disclosure.

According to one embodiment of the present disclosure, a non-transitory computer readable storage medium for storing an application program for network certification is disclosed. The application program is implemented by an electrical device to execute a network certification process. Any suitable storage medium (such as medium) may be used. For example, suitable storage medium can be non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); or magnetic storage devices such as hard disk drives (HDD) and floppy disk drives. In the present disclosure, the network certification process is suitable used in the Ethernet network or wireless network. FIG. 1 is a flow diagram of a network certification process according to one embodiment of the present disclosure. FIG. 2 illustrates a block diagram of an electrical device according to one embodiment of the present disclosure. Please refer to both FIG. 1 and FIG. 2.

When an electrical device 200 is located in a wireless network and reads a non-transitory computer readable storage medium of an embodiment of the present disclosure, a network certification application program 231, which is stored in the non-transitory computer readable storage medium, is loaded into an operating system (OS) 230 of the electrical device 200, such that the electrical device 200 executes a network certification process 100. Wherein, the OS 230 is executed by a processing unit of the electrical device 220. The network certification process 100 includes the following steps:

At step 110, a network module 210 of the electrical device 200 is driven to receive a certification code, which is broadcasted by a network access point (AP) 260. The network access point (AP) 260 may be a wireless access point (WAP). Wherein, the electrical device 200 may utilize a network module driver 232, which is installed in the OS 230, to drive its network module 210 to perform the receiving function at step 110. The network module 210 may be a wireless network card or any other hardware able to receive the certification code broadcasted by the network AP 260. In some embodiments, a Service Set Identifier (SSID) of the network AP 260 may be taken as the certification code for the network module 210 of the electrical device 200 to receive. In addition, the certification code may be any other type of certification code broadcasted by the network AP 260.

At step 120, determine if the certification code is in an identified list. In some embodiments, the identified list may be pre-stored in a storage unit 220 of the electrical device 200.

At step 130, when the certification code is not in the identified list, the application program 231 executes an action to limit communication between the electrical device 200 and the network AP 260. Hence, when the electrical device 200 cannot receive the certification code in the identified list, the electrical device 200 may execute limited functions. When the electrical device 200 is taken away from the area served by the network AP 260 in the identified list, the electrical device 200 cannot perform all supported functions. In addition, the network AP 260 is usually disposed in a fixed position, which cannot be moved easily, and the certification code of the network AP 260 cannot be stolen or reproduced easily after being encrypted by a security key. Accordingly, the network certification process 100 may not be broken easily by stealing or reproducing the certification code.

Moreover, when the certification code is not in the identified list, the application program 231 may further drive an alert signal generating unit 250 of the electrical device 200 to generate an alert signal. The alert signal may be a light signal, a sound signal or any other type of alert signal. Therefore, the alert signal may stop others from stealing the electrical device 200.

When the certification code is in the identified list, the network module 210 of the electrical device 200 may keep receiving the certification code broadcasted by the network AP 260.

In some embodiments of the present disclosure, the network certification process 100 may further include the following steps: the application program 231 is utilized to drive the electrical device 200 to provide a user interface 240. Hence, a user can edit the identified list stored in the storage unit 220 through the user interface 240. Subsequently, an edit signal corresponding to the edit operation can be received through the user interface 240. The electrical device 200 edits the identified list according to the edit signal. In addition, a user can input an unlock password through the user interface 240 to switch the electrical device 200 from the limited function mode to an un-limited function mode.

In some embodiments of the present disclosure, the application program 231 may be utilized to disable actions of the electrical device 200, such that the communication between the electrical device 200 and the network AP 260 can be limited at step 130.

In some other embodiments of the present disclosure, the application program 231 to drive the electrical device 200 to stop accessing the network provided by the network AP 260.

In some other embodiments of the network certification process 100, when the electrical device 200 is initiated, the electrical device 200 is triggered to execute the application program 231 to start to drive the network module 210 to receive the certification code. Therefore, the network certification process 100 can be triggered once the electrical device 200 is initiated.

Figure 3:
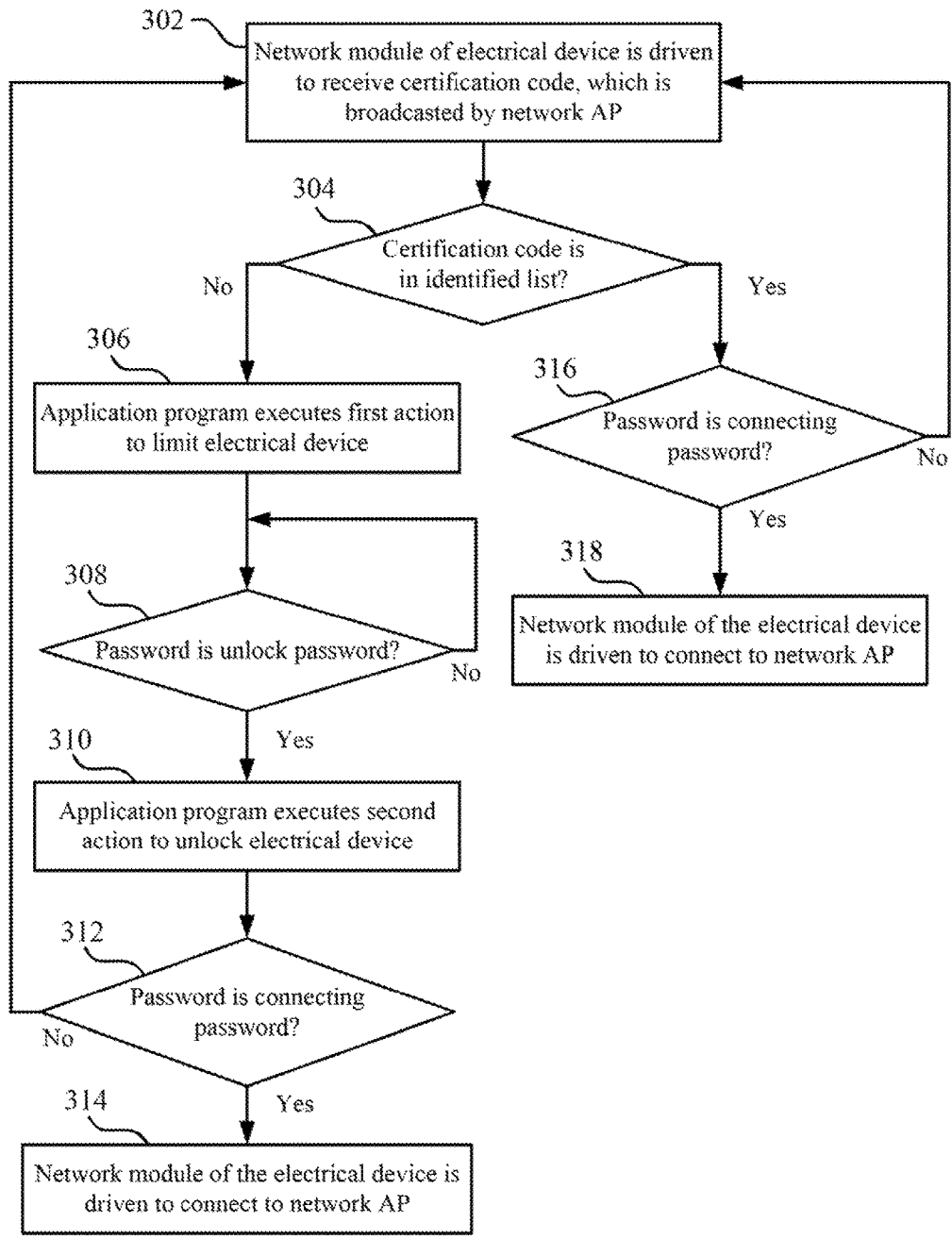
FIG. 3 is a flow diagram of a network certification process according to one embodiment of the present disclosure.

FIG. 2 illustrates a block diagram of an electrical device 200 according to one embodiment of the present disclosure. FIG. 3 is a flow diagram of a network certification process 300 according to one embodiment of the present disclosure. Please refer to both FIG. 2 and FIG. 3.

Alternatively or additionally, in some embodiments of the present disclosure, the electrical device 200 executes a network certification process 300. The network certification process 300 includes the following steps as follows.

At step 302, a network module 210 of the electrical device 200 is driven to receive a certification code, which is broadcasted by the network AP 260. The network AP 260 may be a wireless access point (WAP). Wherein, the electrical device 200 may utilize a network module driver 232, which is installed in the OS 230, to drive its network module 210 to perform the receiving function at step 302. The network module 210 may be a wireless network card or any other hardware able to receive the certification code broadcasted by the network AP 260. In some embodiments, a service set identifier (SSID) of the network AP 260 may be taken as the certification code for the network module 210 of the electrical device 200 to receive. In addition, the certification code may be any other type of certification code broadcasted by the network AP 260.

At step 304, a determination is made regarding whether the certification code is in an identified list. In some embodiments, the identified list may be pre-stored in a storage unit 220 of the electrical device 200.

When the certification code is not in the identified list at step 304, the application program 231 executes a first action to limit the electrical device 200 at step 306, and then the electrical device 200 enters a limited function mode. Hence, the electrical device 200 in the limited function mode may be only able to execute limited functions when the network AP 260 is not an allowed network AP. In some embodiments, when the electrical device 200 is taken away from the area served by the network AP 260 in the identified list, the electrical device 200 cannot perform all supported functions except that the electrical device 200 is only able to receive an unlock password. In addition, the network AP 260 is usually disposed in a fixed position, which cannot be moved easily, and the certification code of the network AP 260 cannot be stolen or reproduced easily after being encrypted by a security key. Accordingly, the network certification process 300 may not be broken easily by stealing or reproducing the certification code.

Moreover, when the certification code is not in the identified list, the application program 231 may further drive an alert signal generating unit 250 of the electrical device 200 to generate an alert signal. The alert signal may be a light signal, a sound signal or any other type of alert signal. Therefore, the alert signal may stop others from stealing the electrical device 200.

A user can input a password (e.g., through the user interface 240) to unlock the electrical device 200 from the limited function mode to an un-limited function mode. At step 308, a determination is made regarding whether the password inputted by the user is the unlock password. When the password is not the unlock password, the electrical device remains in the limited function mode until a correct unlock password is inputted. In contrast, when the password is the unlock password, the application program 231 executes a second action to unlock the electrical device at step 310. As a result, the electrical device 200 enters the un-limited function mode so that the electrical device is able to perform all supported functions.

If the user desires to use the electrical device 200 to connect to the unallowed network AP 260 (i.e., the certification code broadcasted by the network AP 260 is not in the identified list), the user must input a connecting password to the electrical device 200 in the un-limited functional mode (e.g., through the user interface 240). After the user inputs a password for connection to the unallowed network AP 260, a determination is made regarding whether the password is the connecting password at step 312. When the password is not the connecting password, the electrical device 200 cannot connect to the unallowed network AP 260 and the network module 210 of the electrical device 200 is driven to receive the certification code at step 302. In contrast, when the password is the connecting password, the application program 231 drives the network module 210 of the electrical device 200 to connect to the unallowed network AP 260 at step 314.

Therefore, when the user desires to use the electrical device 200 to connect to an unallowed network AP 260, the user must input the unlock password for unlocking the electrical device 200 (i.e., first stage of verification) and then input the connecting password for connecting to the unallowed AP (i.e., second stage of verification). The network certification process 300 with two-stage verification provides a more secure process for connecting to the unallowed network AP 260.

In some embodiments of the present disclosure, at step 304, the certification code is in the identified list, which indicates that the network AP 260 is an allowed network AP. If the user desires to use the electrical device 200 to connect to the allowed network AP 260, the user must input a connecting password to the electrical device 200 (e.g., through the user interface 240). After the user inputs a password, a determination is made regarding whether the password is the connecting password at step 316. When the password is not the connecting password, the electrical device 200 cannot connect to the allowed network AP 260 and the network module 210 of the electrical device 200 is driven to receive the certification code at step 302. In contrast, when the password is the connecting password, the application program 231 drives the network module 210 of the electrical device 200 to connect to the allowed network AP 260 at step 318.

In some embodiments, the first action executed by the application program 231 to limit the electrical device 200 at step 306 may be an operating system (OS) lock, a hardware component lock or a firmware lock. For example, the OS lock may lock OS 230 of the electrical device 200 and not allow any password to unlock the electrical device 200 except when a network AP 260 is detected again. In other words, the OS lock may allow a password (e.g., the unlock password) to unlock the electrical device 200 only when the network AP 260 is detected again. For another example, the OS lock may lock the OS 230 of the electrical device 200, keep detecting network APs 260, and allow a supervisor password (e.g., the unlock password) inputted to the electrical device 200 in order to unlock the electrical device 200. For yet another example, the OS lock may lock one or more application software in the electrical device 200 so that the locked application software cannot be launched by the electrical device 200. For yet another example, the OS lock may lock OS of the electrical device 200, drive the electrical device 200 to provide a user interface 240 for receiving the unlock password and mask all outputs of the electrical device 200 except the user interface 240.

The hardware component lock, for example, may lock at least one input and output port (e.g., universal serial bus (USB), RJ45 local area network (LAN), external serial advanced technology attachment (eSATA), storage card, optical disk drive (ODD), audio, camera, BT) and at least one input unit (e.g., keyboard and mouse) of the electrical device 200. Alternatively, the hardware component may lock all input and output ports and all input units. For another example, the hardware component lock may disable all outputs of display screen of the electrical device 200 except when a network AP 260 is detected. For yet another example, the hardware component lock may lock a processing unit (e.g., central processing unit (CPU)) of the electrical device 200 to a lowest performance state except when a supervisor password (i.e., the unlock password) is received or a network AP 260 is detected.

The firmware lock, for example, may inform a controller of the electrical device 200 to disable at least one input unit (e.g., keyboard and mouse) no matter whether the electrical device 200 executes a reboot process. For another example, the firmware lock may inform basic input/output system (BIOS) firmware of the electrical device 200 to lock the storage unit 220 (e.g., a hard disk drive (HDD) storage or a primary storage), and if the HDD storage or the primary storage is changed, the firmware lock may not allow the electrical device 200 to boot when the electrical device 200 is powered on. For yet another example, the firmware lock may inform the BIOS firmware to lock the electrical device 200, and the electrical device 200 may be unlocked by connecting to a server that is in an identified server list through a network cable. If the BIOS firmware cannot detect an active server (e.g., the active server is in an identified server list, and the identified server list may be pre-stored in the storage unit 220 of the electrical device 200), then the firmware lock may not allow the electrical device 200 to be powered on next time. In contrast, if the BIOS firmware detects an active server, the application program 231 executing the second action to unlock the electrical device 200 to the un-limited function mode.

The present disclosure can achieve many advantages. When the electrical device applying the present disclosure is taken away from the area served by the network AP in the identified list, the electrical device cannot perform all supported functions. In addition, the network AP is usually disposed in a fixed position, which can not be moved easily, and the certification code of the network AP can not be stolen or reproduced easily after being encrypted by a security key. Accordingly, the network certification process of the present disclosure can be used in the Ethernet network or wireless network, and may not be broken easily by stealing or reproducing the certification code. Furthermore, others may not want to seal the electrical device applying the present disclosure.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present disclosure cover modifications and variations of the present disclosure provided they fall within the scope of the following claims.

What is claimed is:

1. A non-transitory computer readable storage medium for storing an application program for network certification, the application program being implemented by an electrical device to execute a network certification process, the network certification process comprising the steps of:
    driving a network module of the electrical device to receive a certification code, which is broadcasted by a network access point (AP);
    determining if the certification code is in an identified list;
    executing a first action to limit the electrical device to operate in a limited function mode and to receive a password, by the application program, only when the certification code is not in the identified list;
    determining whether or not the password is an unlock password by the application program;
    executing a second action to unlock the electrical device, by the application program, to make the electrical device operate in an un-limited function mode when the password is the unlock password; and
    when the electrical device is in the un-limited function mode and a connecting password is received, driving the network module of the electrical device to connect to the network AP.

2. The non-transitory computer readable storage medium of claim 1, wherein the network certification process further comprises the step of:
    when the certification code is in the identified list and the connecting password is received, driving the network module of the electrical device to connect to the network AP.

3. The non-transitory computer readable storage medium of claim 1, wherein the certification code is a Service Set Identifier (SSID) of the network AP.

4. The non-transitory computer readable storage medium of claim 1, wherein the network certification process further comprises the steps of:
    utilizing the application program to drive the electrical device to provide a user interface;
    receiving an edit signal through the user interface; and
    editing the identified list according to the edit signal.

5. The non-transitory computer readable storage medium of claim 1, wherein the step of limiting the electrical device to the limited function mode comprises the step of:
    utilizing the application program to disable functions of the electrical device, wherein the electrical device in the limited mode is only able to receive the unlock password.

6. The non-transitory computer readable storage medium of claim 1 wherein the step of limiting the electrical device to the limited function mode comprises the step of:
    utilizing the application program to drive the electrical device to stop accessing the network.

7. The non-transitory computer readable storage medium of claim 1, wherein the network certification process further comprises the step of:
    when the certification code is not in the identified list, utilizing the application program to drive the electrical device to generate an alert signal.

8. The non-transitory computer readable storage medium of claim 7, wherein the alert signal is a light signal or a sound signal.

9. The non-transitory computer readable storage medium of claim 1, wherein the network certification process further comprises the step of:
    when the electrical device is initiated, triggering the electrical device to implement the application program to start driving the network module to receive the certification code.

10. The non-transitory computer readable storage medium of claim 1, wherein the first action is an operating system (OS) lock, and the step of limiting the electrical device to the limited function mode comprises the steps of:
    locking an OS of the electrical device; and
    allowing the electrical device to receive the unlock password only when the network AP is not an allowed network AP.

11. The non-transitory computer readable storage medium of claim 1, wherein the first action is an operating system (OS) lock, and the step of limiting the electrical device to the limited function mode comprises the steps of:
    locking an OS of the electrical device;
    keeping detecting the network AP; and
    allowing the electrical device to receive the unlock password.

12. The non-transitory computer readable storage medium of claim 1, wherein the first action is an operating system (OS) lock, and the step of limiting the electrical device to the limited function mode comprises the step of:
    locking at least one application software to disable the electrical device from launching the at least one application software.

13. The non-transitory computer readable storage medium of claim 1, wherein the first action is an operating system (OS) lock, and the step of limiting the electrical device to the limited function mode comprises the steps of:
    locking an OS of the electrical device;
    driving the electrical device to provide a user interface for receiving the unlock password; and
    masking outputs of the electrical device except the user interface.

14. The non-transitory computer readable storage medium of claim 1, wherein the first action is a hardware component lock, and the step of limiting the electrical device to the limited function mode comprises the step of:
    locking at least one input and output port and at least one input unit of the electrical device.

15. The non-transitory computer readable storage medium of claim 1, wherein the first action is a hardware component lock, and the step of limiting the electrical device to the limited function mode comprises the step of:
    disabling a display screen of the electrical device from outputting except when the network AP is detected.

16. The non-transitory computer readable storage medium of claim 1, wherein the first action is a hardware component lock, and the step of limiting the electrical device to the limited function mode comprises the step of:

locking a processing unit of the electrical device to a lowest performance state except when the unlock password is received or the network AP is detected.

17. The non-transitory computer readable storage medium of claim 1, wherein the first action is a firmware lock, and the step of limiting the electrical device to the limited function mode comprises the step of:

informing a controller of the electrical device to disable at least one input unit no matter whether the electrical device executes a reboot process.

18. The non-transitory computer readable storage medium of claim 1, wherein the first action is a firmware lock, and the step of limiting the electrical device to the limited function mode comprises the steps of:

informing a basic input/output system (BIOS) firmware of the electrical device to lock a storage unit of the electrical device; and in a situation where the storage unit is changed, preventing the electrical device from booting when the electrical device is powered on.

19. The non-transitory computer readable storage medium of claim 1, wherein the first action is a firmware lock, and the step of limiting the electrical device to the limited function mode comprises the steps of:

informing a BIOS firmware of the electrical device to lock the electrical device, and in a situation where the BIOS firmware cannot detect an active server, preventing the electrical device from being powered on.

* * * * *